United States Patent
Wildermuth et al.

(10) Patent No.: US 12,318,714 B2
(45) Date of Patent: Jun. 3, 2025

(54) REMOVAL SYSTEM INCLUDING REMOVAL AID AND SEPARATING ELEMENT

(71) Applicant: MANN+HUMMEL GMBH, Ludwigsburg (DE)

(72) Inventors: Andreas Wildermuth, Marbach (DE); Frank Pflueger, Sachsenheim (DE); Guenter Jokschas, Murrhardt (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 776 days.

(21) Appl. No.: 17/517,159

(22) Filed: Nov. 2, 2021

(65) Prior Publication Data

US 2022/0088507 A1   Mar. 24, 2022

Related U.S. Application Data

(63) Continuation of application No. 15/635,863, filed on Jun. 28, 2017, now Pat. No. 11,161,064.

(30) Foreign Application Priority Data

Jun. 29, 2016 (DE) ............. 10 2016 007 849.9

(51) Int. Cl.
| | |
|---|---|
| *B01D 46/42* | (2006.01) |
| *B01D 29/11* | (2006.01) |
| *B01D 29/21* | (2006.01) |
| *B01D 29/96* | (2006.01) |
| *B65G 7/12* | (2006.01) |

(52) U.S. Cl.
CPC ............ *B01D 29/11* (2013.01); *B01D 29/21* (2013.01); *B01D 29/96* (2013.01); *B01D 46/4227* (2013.01); *B65G 7/12* (2013.01); *B01D 2201/0415* (2013.01); *B01D 2201/24* (2013.01); *B01D 2201/295* (2013.01)

(58) Field of Classification Search
None
See application file for complete search history.

(56) References Cited

U.S. PATENT DOCUMENTS

| | | | |
|---|---|---|---|
| 11,161,064 B2* | 11/2021 | Wildermuth | B01D 29/11 |
| 2008/0308504 A1* | 12/2008 | Hallan | B01D 63/10 |
| | | | 210/741 |
| 2015/0196999 A1* | 7/2015 | Sampath | B25B 7/02 |
| | | | 81/418 |

* cited by examiner

*Primary Examiner* — Hayden Brewster

(57) ABSTRACT

A removal system is provided with a separating element for separating contaminants contained in a fluid and with a removal aid for removing the separating element from a housing. The separating element has an end disk arranged at an end face of the separating element. The end disk has a central recess. The removal aid has a grip section and at least two locking fingers. The locking fingers extend along a center axis of the removal aid away from the grip section. Each locking finger has a hook element that serves for engaging behind the end disk of the separating element radially outside of an end disk area that delimits in radial outward direction immediately the central recess. A removal aid for such a removal system is provided.

9 Claims, 8 Drawing Sheets

REMOVAL SYSTEM INCLUDING REMOVAL AID AND SEPARATING ELEMENT

BACKGROUND OF THE INVENTION

The invention concerns a removal system and a removal aid for removing a separating element from a housing.

Separating elements, for example, fuel or oil filters, must be exchanged in regular intervals. For this purpose, the separating elements to be exchanged are to be removed from a housing in which they are arranged during use. For removal of the separating elements from the housing, often standard tools such as screwdrivers or pliers are used in practice, for example, in an automotive repair shop. With these tools, it is attempted to pry and/or pull out the separating element from the housing. However, in doing so, there is the risk that the separating element or the housing becomes damaged, in particular in the area of a sealing surface for a housing cover closing off the housing. Broken-off pieces of the separating element may remain within the housing and may cause functional disturbances. Moreover, the employed tools when used improperly can slide off easily which may result in injuries.

U.S. Pat. No. 6,280,620 B1 discloses a removal system with an oil filter and with a socket wrench wherein radially projecting receiving openings on the oil filter are provided that are specifically designed for two corresponding extensions of the socket wrench. By means of the socket wrench, the oil filter can be rotated about a longitudinal axis when the extensions are inserted into the receiving openings. A disadvantage of this configuration of the oil filter is in particular that the receiving openings must be formed on the oil filter so as to project radially. This results in the space requirement of the oil filter to be disadvantageously increased. Also, pulling out the oil filter from the housing in axial direction is not possible with the socket wrench.

EP 1 817 093 B1 discloses a fuel filter element with an end disk and with a folding grip arranged fixedly on the element. In order not to enlarge the size of the oil filter excessively or not to impair the flow through the oil filter, such a grip must however be designed to be very slim. In this way, handling is made more difficult and there is the risk that the grip will fail upon removal of the oil filter. Moreover, the grip makes the oil filter more expensive because the grip is an integral component of the oil filter. A comparable removal system is disclosed in DE 11 2009 000 742 T5.

DE 44 15 890 A1 discloses a further removal system with a filter element comprising an end disk with a central opening. For removing the filter element from a housing, a removal aid with two locking fingers is provided which are inserted immediately through the central opening of the end disk and locked with a grid-shaped support tube of the filter element. The removal aid is configured to be so small that only one finger can be passed through for gripping. Therefore, the force introduction is made difficult for a user. Moreover, the grip engaged on the filter element can easily tilt which increases the risk of injury.

It is therefore the object of the invention to provide a removal system, comprising a separating element for separating contaminants contained in a fluid and further comprising a removal aid, and to further provide a removal aid for such a system, the removal system and the removal aid enabling a reliable, quick, and comfortable removal of the separating element from a housing, without the removal aid enlarging the size of the separating element in separating operation of the separating element, impairing flow through the separating element, or increasing the manufacturing costs of the separating element.

SUMMARY OF THE INVENTION

The object concerning the removal system is solved by a removal system including:
a separating element for separating contaminants contained in a fluid, with a separating medium and with an end disk arranged at the end face on the separating element and comprising a centrally arranged recess, and
removal aid for removing the separating element from a housing,
wherein the removal aid comprises a grip section and two or more locking fingers arranged to be spaced apart from each other, which each extend along a center axis of the removal aid away from the grip section, and
wherein on each locking finger a hook element is arranged for engaging behind the end disk of the separating element radially outside of an end disk region which immediately delimits the central recess in radial outward direction.

The object concerning the removal aid is solved by a removal aid comprising a grip section and two or more locking fingers arranged to be spaced apart from each other, which each extend along a center axis of the removal aid away from the grip section, and wherein on each locking finger a hook element is arranged for engaging behind the end disk of the separating element radially outside of an end disk region which immediately delimits the central recess in radial outward direction.

In the removal system according to the invention, the removal aid is connected (locked/snapped on) with the separating element only for removal of the separating element from the housing. After removal of the separating element, the separating element is typically disposed off together with the removal aid or, for its reuse, is separated from the separating element. The size of the separating element is therefore not enlarged by the removal aid because the latter is not arranged on the separating element during use of the separating element. In its coupled or locked state on the separating element, the removal aid does not engage with its locking fingers in the central recess of the end disk of the separating element. Instead, the hook elements, in a radial direction relative to the longitudinal axis of the separating element, engage the end disk from behind outside of an end disk region that immediately delimits the central recess in radial outward direction. In this way, the removal system according to the invention enables as a whole a simplified and more reliable removal of the separating element from a housing. By means of the removal aid, the separating element can be loaded with such a great torque that it can be loosened more easily from its sealing seat in the housing. Since the removal aid is not an integral component of the separating element, the separating element as a whole can be produced less expensively and more compact. The central recess of the end disk as well as the end disk region adjoining the central recess can therefore be designed solely with respect to a desired flow guidance of the fluid or a sealing action of the end disk relative to the adjoining housing parts. The separating element can be configured, for example, as a fuel or oil filter but also as a water separator for water contained in fuel.

The separating medium encloses typically an interior of the separating element in a radial direction. In this context, the central recess of the end disk opens an access to the interior in axial direction. The separating medium can be configured as a star-shaped folded filter bellows.

The grip section of the removal aid is preferably configured such that it can be gripped by at least two fingers, preferably by four fingers, of the human hand. In particular, the grip section can have grip depressions for the fingers. The grip section is preferably arranged centrally on the removal aid in such a way that, when the removal aid is locked on the end disk, it spans the central recess of the end disk. Alternatively, the grip section can also be of a two-part configuration, for example, in such a way that two grip part sections that are separate from each other are projecting radially in outward direction away from the removal aid.

For locking the removal aid on the end disk, the locking fingers can be deformed in radial direction, preferably elastically. In other words, the locking fingers are spreadable or compressible relative to each other. When the removal aid has been pushed far enough onto the end disk, the locking fingers spring back automatically into the unloaded initial position and cause the hook elements to engage the end disk from behind.

According to a preferred embodiment of the invention, the removal aid engages with its locking fingers the outer circumference of the end disk in its locked state on the end disk. The locking fingers extend thus in radial outward direction on an outer circumference of the end disk. In this way, a support width of the removal aid on the end disk is provided that is as large as possible. This improves the stability of the coupling action of the removal aid on the end disk and facilitates the introduction of torque into the separating element. For removal of the separating element, the removal aid can be inserted into a slot between the end disk and the housing. Typically, the locking fingers are contacting the end disk radially outwardly. This further improves the stability of the coupling action and provides lateral movement clearance for removal of the separating element.

A particularly preferred further development of this embodiment provides that the separating medium is configured as a star-shaped folded bellows which surrounds the longitudinal axis of the separating element in an annular shape, wherein the hook elements of the locking fingers in radial direction extend into folds of the separating medium. The separating medium in the form of a star-shaped bellows can serve as a filter medium or as a coalescing medium. Due to the folds, a large filter surface area can be provided with a compact configuration of the separating element. The locking fingers are arranged spaced apart from each other in such a way that they mesh with the folds when the removal aid is locked on the end disk. By means of the engagement of the hook elements in the folds, torque can be introduced into the separating element and the separating element can thereby be loosed in a simple way from its seat in the housing. Moreover, it is made possible to engage the end disk from behind with the hook elements in radial inward direction even when the end disk in radial direction is not projecting circumferentially past the separating medium.

According to the invention, the hook elements can be configured in particular for the purpose of engaging flow openings of the end disk which are arranged relative to the central recess of the end disk so as to be displaced in radial outward direction. The hook elements and/or the locking fingers can then be supported also in circumferential direction on a respective wall of the flow openings so that the separating element can be rotated also about a longitudinal axis with the removal aid. In this way, the separating element can be loosened more easily from its seat in the housing and can be pulled out with reduced force expenditure in axial direction (relative to the longitudinal axis of the separating element) from the housing.

A preferred embodiment provides that the end disk of the separating element comprises an annular slot and the locking fingers of the removal aid extend into the annular slot. Preferably, the end disk comprises an outer shoulder which delimits the annular slot in radial outward direction and the hook elements engage behind the outer shoulder. By a configuration of the end disk with annular slot, the flow through the separating element and the sealing action of the separating element relative to the housing can be improved. Such separating elements can be removed from the housing only with difficulty by means of unsuitable tools. The removal aid takes advantage of the configuration of the end disk in order to provide a particularly simple and reliable coupling action. Preferably, the annular slot comprises flow openings which are engaged by the locking fingers and/or hook elements of the removal aid when the removal aid is locked on the end disk.

In a preferred embodiment, it is provided that the hook elements are extending in radial direction outwardly, respectively. The removal aid can then be attached in a simple way on the end disk when the end disk comprises a circumferential groove, a circumferential annular slot, or further openings positioned in radial direction outward relative to the central recess. The hook elements of the removal aid engage then, for example, an outer shoulder of the end disk in radial outward direction. In use of the separating element, the outer shoulder can be supported fluid-tightly on the housing.

Preferred is also an alternative embodiment thereto in which the hook elements are oriented in radial direction inwardly, respectively. In this way, it is made possible to radially engage from behind the end disk from the exterior. The locking fingers in the locked state can then contact an outer circumference of the end disk.

A particularly advantageous embodiment provides that the removal aid comprises at least two arms, wherein on each one of the arms at least two, preferably at least five, locking fingers are formed. The locking fingers can then be configured to be particularly slim. In this way, contacting and locking of the removal aid on the end disk is facilitated. At the same time, the stability of the removal aid is ensured. The locking fingers of an arm can be arranged to be spaced apart from each other in particular such that, when the removal aid is locked on the end disk, they mesh with folds of a separating medium that is arranged axially behind the end disk.

In a further particularly preferred embodiment, it is provided that the removal aid comprises three locking fingers. In particular, one locking finger is formed on a first end of a grip section of the removal aid and two locking fingers are arranged on a second end of the grip section. Due to this configuration, the risk of tilting or sliding off of the removal aid when locking the removal aid on the end disk as well as when pulling out the separating element from the housing is further reduced. A spacing distance between the two locking fingers at the second end of the grip section corresponds preferably at least to the width of one of these locking fingers. In this way, the support action of the removal aid can be further improved. Moreover, between the two locking fingers at the second end of the grip section, a web or the like of the end disk can be received. It is then possible by rotation of the removal aid to introduce torque about the longitudinal axis of the separating element into the separating element.

The locking fingers are preferably positioned on a circular path. The hook element of a locking finger or the hook elements of the locking fingers of one arm can extend across a segment angle of between 10° and 90° on this circular path. The covered segment angle preferably amounts to at least 15°, particularly preferred at least 20°. The covered segment angle preferably amounts to at most 40°, particularly preferred at most 30°.

Particularly preferred, at least some of the hook elements are formed with an insertion ramp and a projection, wherein the projection is arranged on the respective hook element so as to face away from a grip section of the removal aid and wherein each projection comprises a centering surface, the centering surface extending substantially parallel or at an acute angle relative to the center axis of the removal aid. Typically, all hook elements are provided with an insertion ramp and a projection. Preferably, the centering surface adjoins the insertion ramp. The acute angle preferably amounts to at most 20°. In this way, it can be achieved that the removal aid upon contacting the end disk becomes centered relative thereto. The locking action of the removal aid on the end disk is thereby facilitated. Moreover, the centering surfaces provide a guiding action so that the risk of sliding off of the removal aid from the end disk upon locking can be further reduced.

In an advantageous embodiment, it is provided that the removal aid comprises a preferably tubular centering socket which is insertable into the central recess of the end disk of the separating element. The centering socket is typically formed with an outer diameter that is minimally smaller, approximately by at most 10%, than an inner diameter of the central recess of the end disk. Preferably, the centering socket projects in axial direction past the hook elements or their projections. Due to the centering socket, the removal aid can be guided upon contacting and locking of the removal aid on the end disk. Moreover, by engagement of the centering socket in the central recess, it can be prevented that the removal aid upon removal of the separating element from the housing can laterally slide off the end disk of the separating element to be removed from the housing.

The removal aid for a removal system with the afore described features enables a particularly simple, reliable, and little time-consuming removal of the separating element from the housing. The removal aid can be comprised in particular of a plastic material or a metallic material, wherein the removal aid is preferably embodied as an injection molded part. A removal aid of plastic material can be manufactured particularly inexpensively and has a minimal weight. A removal aid of a metallic material can be designed to be particularly sturdy. A removal aid of a metallic material according to the invention can be produced by a 3-D printing method. By means of a 3-D printing method, even small lot sizes of removal aids can be economically produced.

Further advantages of the invention result from the description and the drawing. The afore described features to be further explained in the following can be used according to the invention individually by themselves or several combined in any combination.

BRIEF DESCRIPTION OF THE DRAWINGS

FIG. 2b shows a schematic, perspective view of the removal aid of FIG. 2a.

FIG. 4b shows a schematic view of the removal aid and of the separating element of FIG. 4a.

DETAILED DESCRIPTION

Figure 1A:
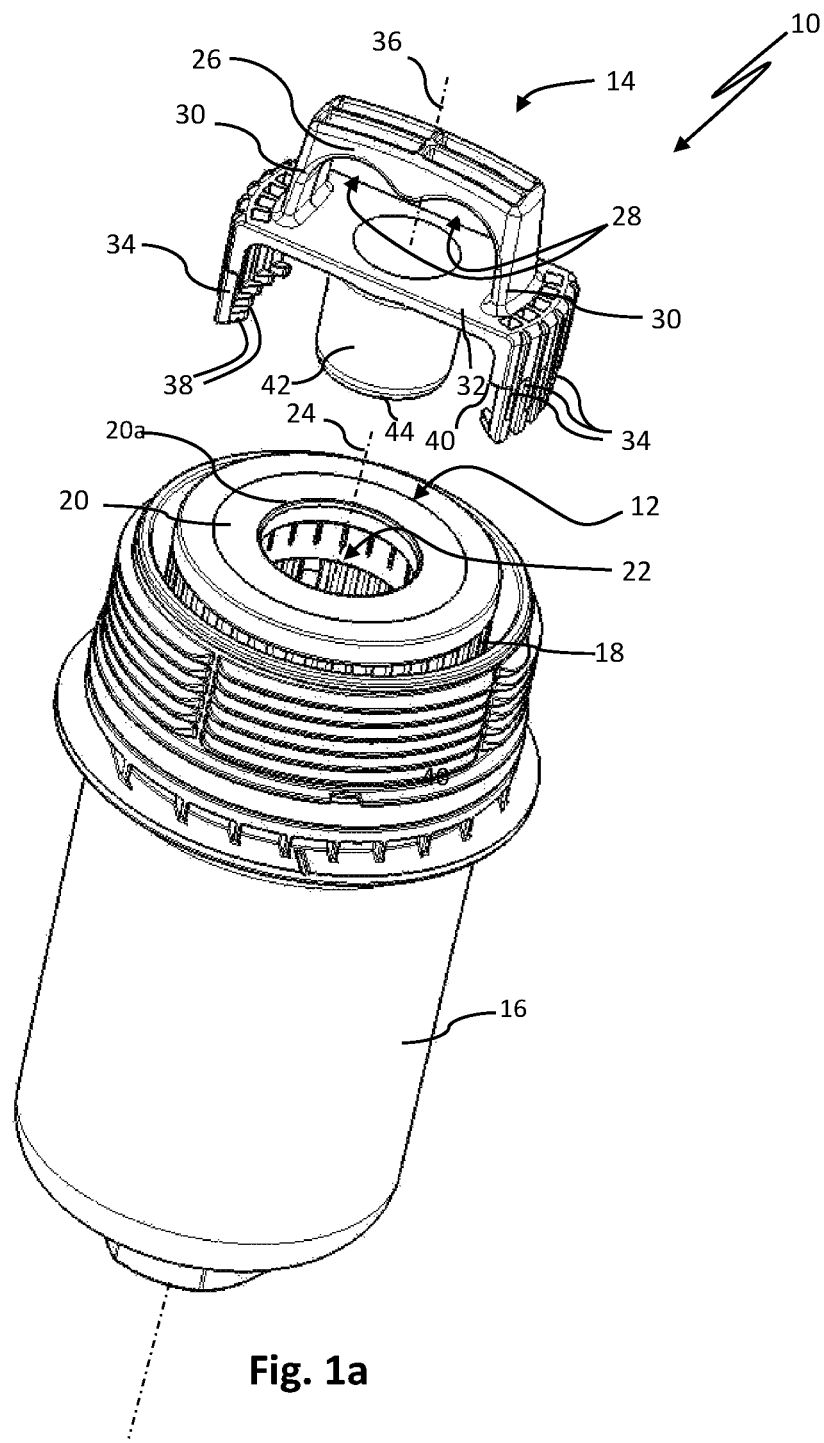
FIG. 1a shows a schematic, perspective view of a separating element in a housing and a first embodiment of a removal aid according to the invention.

FIG. 1a shows a schematic, perspective view of a removal system 10 according to the invention comprising a separating element 12 for separating contaminants contained in a fluid, here oil, and a removal aid 14 by means of which the separating element 12 can be removed comfortably from a housing 16. The separating element 12 is embodied, for example, as an oil filter and comprises a filter medium 18 as well as an end disk 20 arranged at the end face and provided with a central recess 22 through which the fluid can be guided out of the separating element 12. In radial direction, the central recess is immediately delimited outwardly by an end disk region 20a, or rim area, of the end disk 20. The filter medium 18 is arranged in an annular shape relative to the longitudinal axis 24 of the separating element 12 and, with one end, is held embedded in the illustrated upper end disk 20 or is glued to the end disk 20. The filter medium 18 can be flowed through by the fluid in a radial direction relative to the longitudinal axis 24 from the exterior to the interior.

The removal aid 14 comprises a grip section 26 which is provided for ergonomic reasons with two grip depressions 28. The grip section 26 can be gripped by several fingers (not illustrated) of a hand of a user of the removal aid 14. The grip section 26 comprises as a whole a U-shaped form with two arms or legs 30 which are arranged to be spaced apart from each other. The legs 30 are attached at one end to an intermediate plate 32, respectively. On the intermediate plate 32, five locking fingers 34 are integrally formed here at both ends, respectively, and are extending along a center axis 36 of the removal aid 14 away from the intermediate plate 32 or the grip section 26. It is understood that also more or fewer than five locking fingers can be provided. The locking fingers 34 each comprise a terminally arranged hook element 38 that is projecting away from the respective locking finger 34 in radial inward direction.

The removal aid 14 comprises an axial stop 40 for the end disk of the separating element 12 to be removed from the housing 16. The axial stop 40 is facing in the direction of the hook elements 38 and is formed in an exemplary fashion by the locking fingers 34.

The removal aid 14 may comprise a centering socket 42 which is preferably tubular and which is insertable into the central recess 22 of the end disk 20 of the separating element 12. In the illustrated embodiment of FIG. 1a, the centering socket 42 is arranged on the intermediate plate 32 in an exemplary fashion and extends away from the intermediate plate 32 in axial direction coaxially to the center axis 36 of the removal aid 14. The centering socket 42 can project with its free end 44 in axial direction past the locking fingers 34 in order to enable a reliable guiding action of the removal aid 14 upon coupling on the end disk 20 of the separating element 12. According to an embodiment that is not illustrated in detail in the Figures, the aforementioned axial stop 40 can also be formed by a collar or the like which is projecting in radial direction away from the centering socket 42.

Figure 1B:
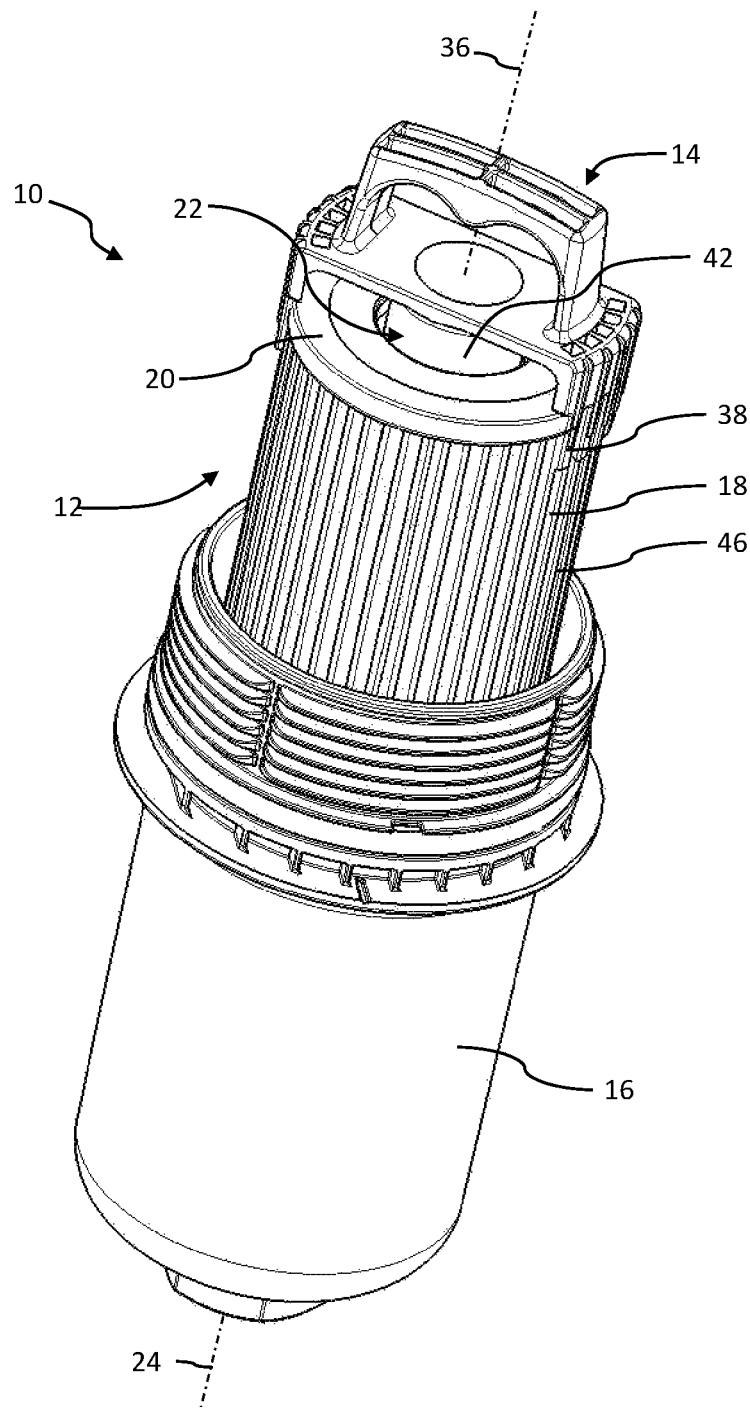
FIG. 1b shows a schematic, perspective view of the removal aid of FIG. 1a, locked on an end disk of the separating element, during a removal process.

FIG. 1b shows the removal system 10 according to the invention of FIG. 1a during the removal process of the separating element 12 from the housing 16. The removal aid 14 is locked with the end disk 20 of the separating element 12. The locking fingers 34 engage across the end disk 20 at the outer circumference and engage behind the end disk 20 with their hook elements 38. In this context, the hook elements 38 can engage in particular from the exterior in radial direction in folds 46 of the separating medium 18. In this case, the removal aid 14 is secured against rotation, or substantially secured against rotation, on the separating element 12 by the separating medium 18 so that the separating element 12 can be loosened in a simplified way from its seat in the housing 16. Due to the locking fingers 34, a multi-point locking action of the removal aid 14 on both sides of the end disk 20 of the separating element 12 is moreover ensured. Additionally, the centering socket 42 extends through the central recess 22 of the end disk 20 into the separating element 12. Therefore, the removal aid 14 cannot tilt relative to the end disk 20 so that an accidental detachment of the locking fingers 34 from engagement with the end disk 20 is prevented. When removing the separating element 12 from the housing 16, an injury-prone sliding off of the removal aid 14, locked with the end disk 20, from the separating element 12 is therefore reliably counteracted.

Figure 1C:
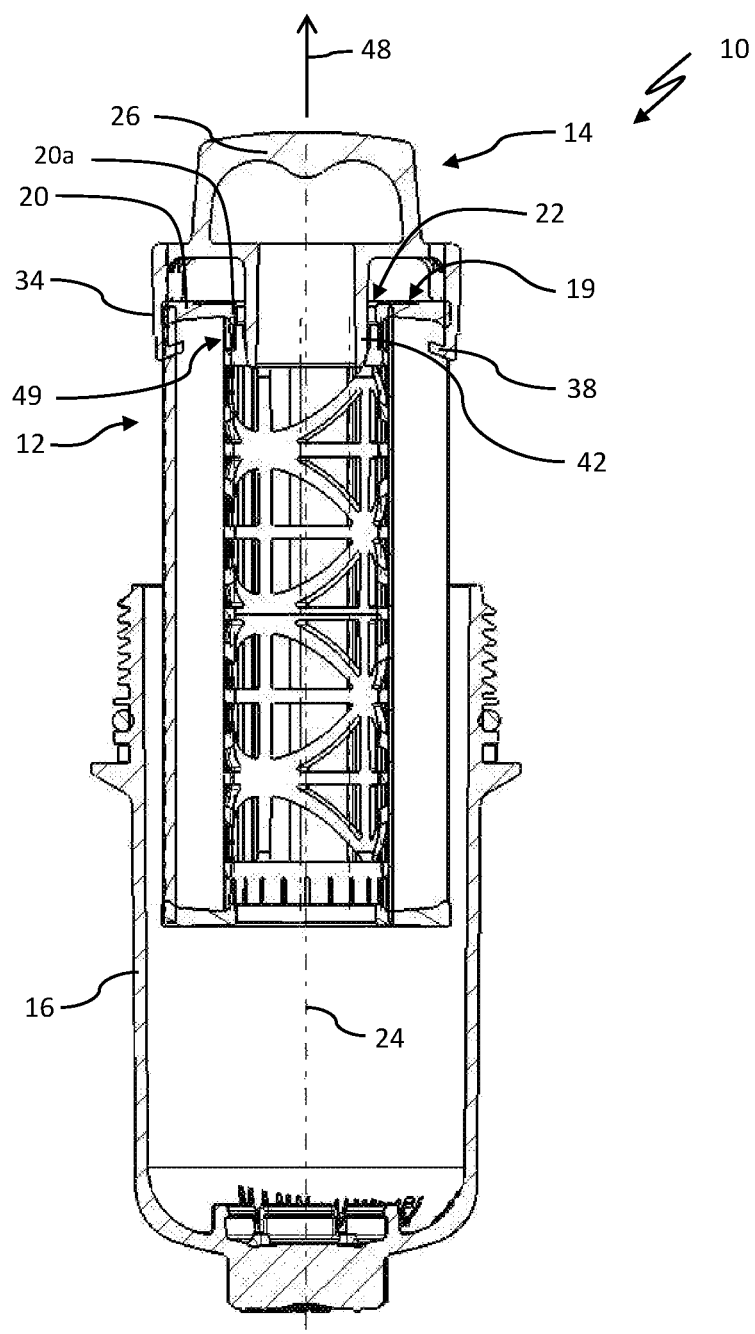
FIG. 1c shows a schematic section illustration of the removal aid and of the separating element of FIGS. 1a, 1b.

FIG. 1c shows the removal system 10 of FIG. 1b in a longitudinal section with the removal aid 14 coupled on the separating element 12 during the removal process. The axial stop 40 and the hook elements 38 of the locking fingers 34 are spaced apart from each other in axial direction such that the removal aid 14 is arranged so as to be lockingly secured with axial clearance on the end disk 20. It is understood that the axial stop 40 and the hook elements 38 can also be spaced apart from each other such that the removal aid 14 is lockable without such axial clearance with the end disk 20.

When locking the removal aid 14 with the end disk 20 of the separating element 12, the removal aid 14 is first pushed in axial direction onto the separating element 12 arranged in the housing 16 until the end disk 20 of the separating element 12 contacts the axial stop 40 of the removal aid 14. The locking fingers 34 of the removal aid 14 are guided in this context against the end disk 20 and in this way elastically deflected relative to the center axis 36 of the removal aid 14 in radial outward direction. As soon as the hook elements 38 have passed the end disk 20 in axial direction, the locking fingers 34 snap automatically back into their locking position in which the hook elements 38 engage from behind the end disk 20. The separating element 12 is subsequently pulled out from the housing 16 by means of the removal aid 14, held in locked engagement on the separating element 12, in the direction of arrow 48 along the center axis 36 of the removal aid 14 or the longitudinal axis 24 of the separating element 12. In its locked state on the end disk 20 of the separating element 12, the removal aid 14 engages the end disk 20 outside of an end disk region 20a that immediately delimits outwardly the central recess 22 of the end disk in radial direction. In other words, the locking fingers 34 do not engage the central recess 22 of the end disk 20.

Figure 2A:
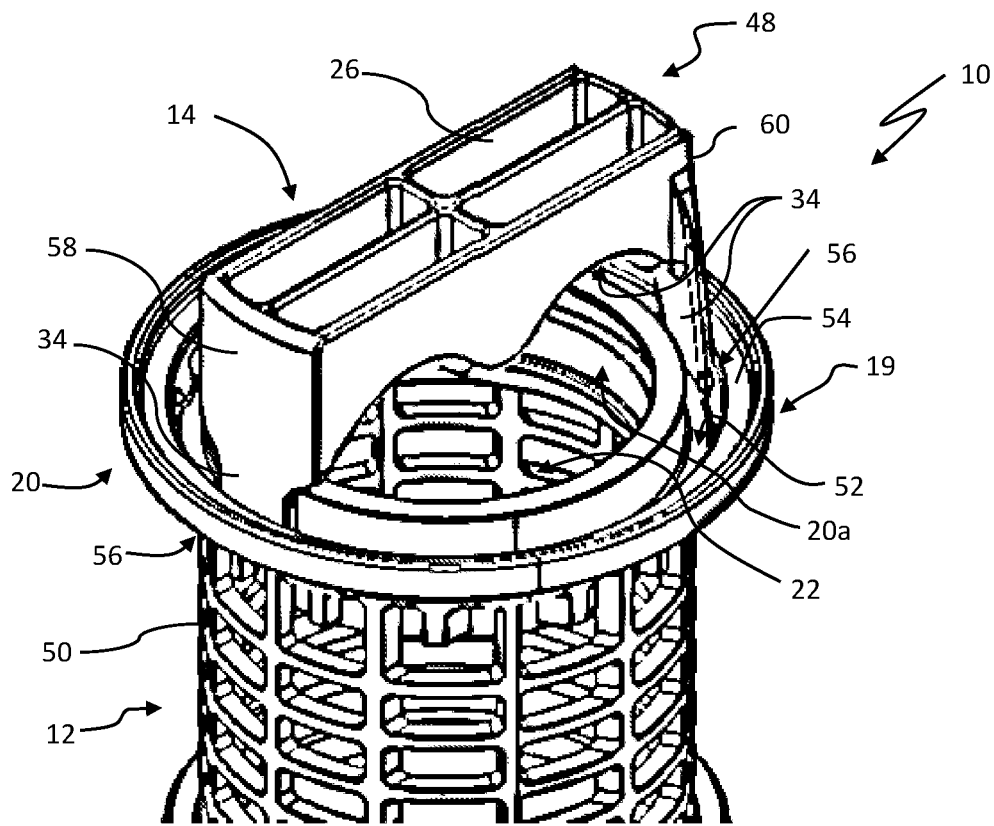
FIG. 2a shows a schematic, perspective illustration of a second embodiment of a removal aid according to the invention, locked on an end disk of a separating element.

FIG. 2a shows a further embodiment of the removal system 10 according to the invention. For reasons of simplifying the illustration, the separating element 12 is illustrated only partially and comprises a grid-like base member 50 (=support tube) which is provided for internal support of the separating medium, for example, a filter medium or a coalescing medium, not illustrated in detail in FIG. 2a. An end disk 20 with a central recess 22 is integrally formed on the base member 15 at the end face. On the end disk 20, an annular slot 52 is formed in radial direction outside of the central recess 22. The annular slot 52 in radial outward direction is circumferentially bounded by an outer shoulder 54 of the end disk 20. The outer shoulder 54 can be inserted fluid tightly into a housing (not illustrated). The outer shoulder 54 can support for this purpose a sealing element which is not illustrated in detail in FIG. 2a. Flow openings 56 are formed in the end disk 20. In circumferential direction of the separating element 12, the flow openings 56 are arranged to be spaced apart from each other. Via the flow openings 56, flow paths for the fluid out of the annular slot 52 into a radial outwardly positioned environment (=raw side) of the separating element 12 or of the separating medium are opened up. In this way, the fluid can flow in operation of the separating element 12 first into the annular slot 52 and from there, via the flow openings 56, radially externally along the separating element 12 in order to then flow through the separating medium (not illustrated) as well as the grid-like base member 50 in radial direction from the exterior to the interior and to finally exit from the separating element 12 via the central recess 22 of the end disk 20.

The removal aid 14 comprises in this context a grip section 26 with a total of three locking fingers 34. One of the locking fingers 34 is arranged at a first end 58 of the grip section 26. At the second end 60 of the grip section 26 which is opposite the first end 58, two locking fingers 34 are arranged (see also FIGS. 2b-2c). Each one of the locking fingers 34 engages a respective flow opening 56. In this context, hook elements 38 (hidden in FIG. 2a; see FIGS. 2b-2c) formed on the locking fingers 34 engage from behind the outer shoulder 54 of the end disk 20 in radial outward direction. The removal aid 14 engages thus from behind the end disk 20 in its state locked on the end disk 20 radially outside of the end disk region 20a that is immediately adjoining the central recess 20. The locking arms 34 thus do not extend into the central recess 22 of the end disk 20.

Figure 2B:
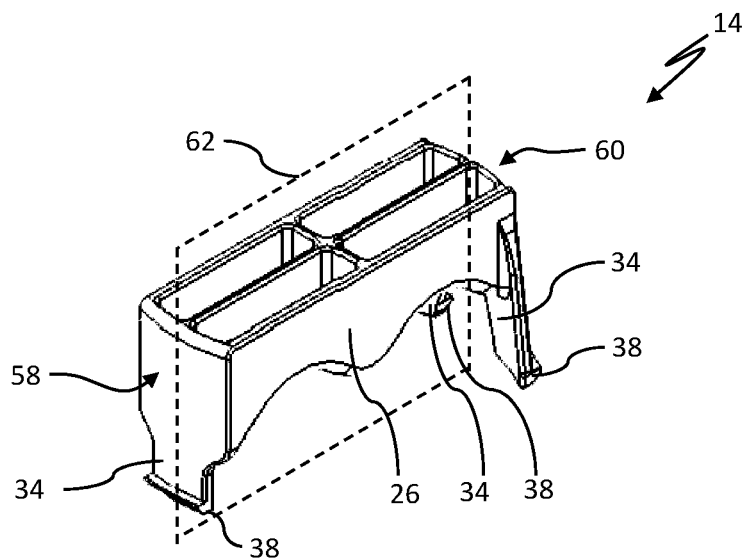

FIG. 2b shows a schematic, perspective illustration of the removal aid 14 of FIG. 2a. The locking finger 34 at the first end 58 of the grip section 26 is embodied symmetric to the center plane 62 of the removal aid 14. The two other locking fingers 34 are arranged spaced apart from the center plane 62, respectively.

For locking the removal aid 14 on the end disk 20 of the separating element 12 (compare FIG. 2a), the removal aid 14 is pushed with the locking fingers 34 leading against the end disk 20. In doing so, the locking fingers 34, upon contact on the end disk 20, are bent in radial direction inwardly so that the hook elements 38 can slide across the outer shoulder 54 of the end disk. As soon as the removal aid 14 has been pushed far enough onto the end disk 20, the locking fingers 34 spring in radial direction outwardly so that the hook elements 38 engage behind the outer shoulder 54. The separating element 12 can then be pulled from the housing by means of the removal aid 14 locked on the end disk 20 (compare FIG. 1a).

Figure 2C:
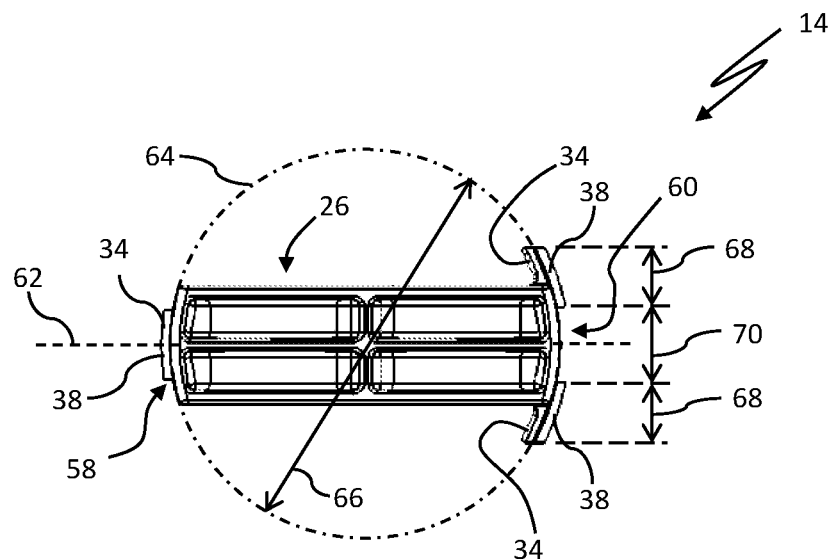
FIG. 2c shows a schematic plan view of the removal aid of FIGS. 2a, 2b.

FIG. 2c shows a schematic plan view of the removal aid 14 according to the FIGS. 2a, 2b. At the first end 58 of the grip section 26, the locking finger 34 with its hook element 38 is arranged symmetric to the center plane 62.

At the second end 60, the locking fingers 34 and the respective hook elements 38 are arranged to be spaced apart from the center plane 62. The locking fingers 34 and the hook elements 38 are arranged on a circular arc 64. A diameter 66 of the circular arc 64 is matched in this context to a shoulder diameter of the outer shoulder (compare FIG. 2a). The locking fingers 34 and the respective hook elements 38 have the same width 68. A spacing 70 is provided between the locking fingers 34 and the respective hook elements 38. The spacing 70 is greater than the width 68 by approximately 20%. Between the locking fingers 34, a web (not illustrated) can be received between flow openings 56 (compare FIG. 2a) of the end disk 20 of the separating element.

Figure 3:
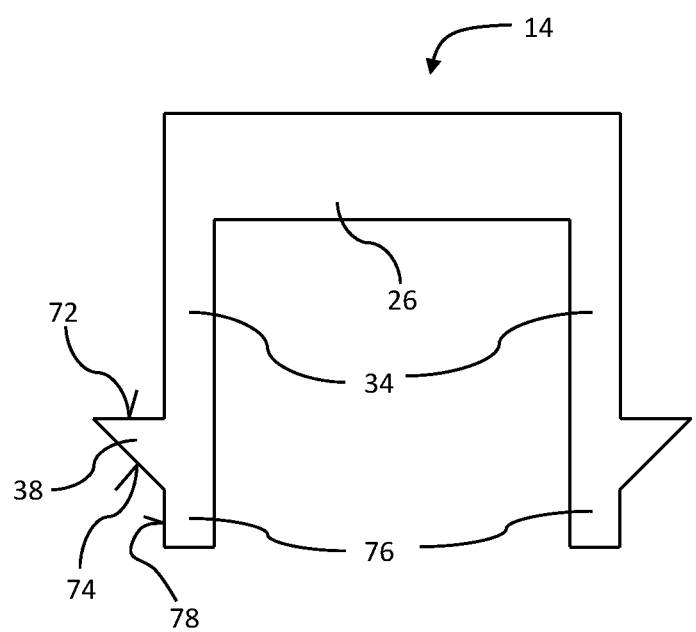
FIG. 3 shows a schematic cross-section of a third embodiment of a removal aid according to the invention, wherein a hook element and a projection are formed on locking fingers of the removal aid, respectively.

FIG. 3 shows schematically a cross-section of a removal aid 14 according to the invention for removal of a separating element from a housing (compare FIGS. 1a, 1b) that is of a particularly simple configuration. The removal aid 14 comprises a grip section 26 with two locking fingers 34 with a hook element 38 each. The hook elements 38 each comprise a locking surface 72 which is facing the grip section 26. Facing away from the grip section 26, an insertion ramp 74 is formed on the hook elements 38, respectively. Beyond the hook element 38, each one of the locking fingers 34 ends in a projection 76. The hook elements 38 face outwardly in radial direction. A centering surface 78 is formed on the projections 76 on the side of the hook elements 38, i.e., externally.

The centering surface 78 begins directly at the insertion ramp 74. The removal aid 14 illustrated in FIG. 3 is locked with the end disk of the separating element radially outside of an end disk region (20a) which is adjoining the central recess (22), as has been shown, for example, in FIGS. 2a, 2b. According to an embodiment which is not illustrated in detail in the drawing, the hook elements 38 in radial direction can project inwardly away from the locking fingers so that the removal aid can be locked with the end disk of the separating element in a way corresponding to that of FIGS. 1a to 1c.

Figure 4A:
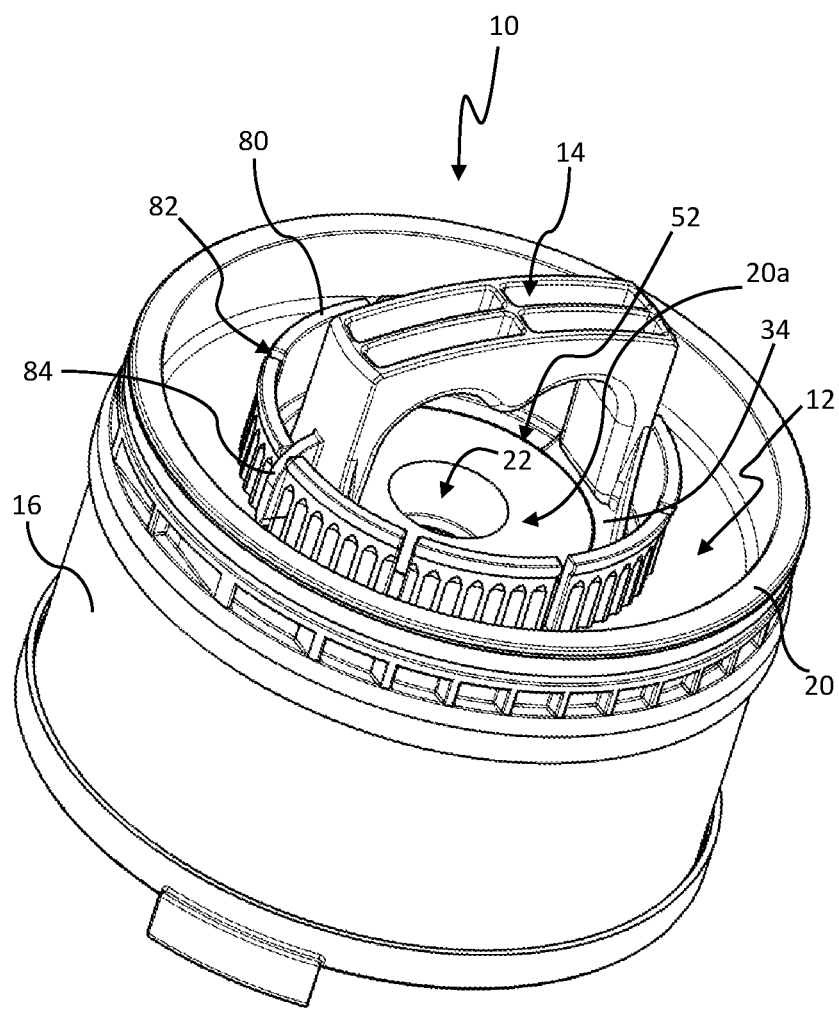
FIG. 4a shows a removal aid according to the invention in a fourth embodiment, locked on a separating element, in a schematic, perspective view.

FIG. 4a shows a further embodiment of a removal system 10 according to the invention. Here, the removal aid 14 is already locked on the separating element 12 for removal of the separating element 12 from a housing 16. The separating element 12 comprises at the end face an end disk 20 with a single central recess 22. The central recess 22 in radial outward direction is delimited immediately by a rim area of the end disk 20, i.e., the end disk region 20a. The removal aid 14 engages with locking fingers 34 an annular slot 52 of the end disk 20.

The end disk 20 comprises an axial collar 80 with slots 82. The slots 82 can be arranged so as to be spaced apart from each other, in particular regularly, in circumferential direction of the end disk 20 on the axial collar 80. The removal aid 14 comprises projections 84 which each extend away in radial outward direction from the locking fingers 34 relative to the center axis 36 of the removal aid 14. The projections 84 engage the slots 82 of the collar 80 in the locked state of the removal aid 14 on the separating element 12. The removal aid is therefore coupled to the end disk 20 of the separating element 12 and secured against rotation. The separating element 12 can thus be rotated by means of the removal aid 14 relative to the housing 16 in order to loosen it from its (sealing) seat and in this way remove it more easily from the housing 16.

Figure 4B:
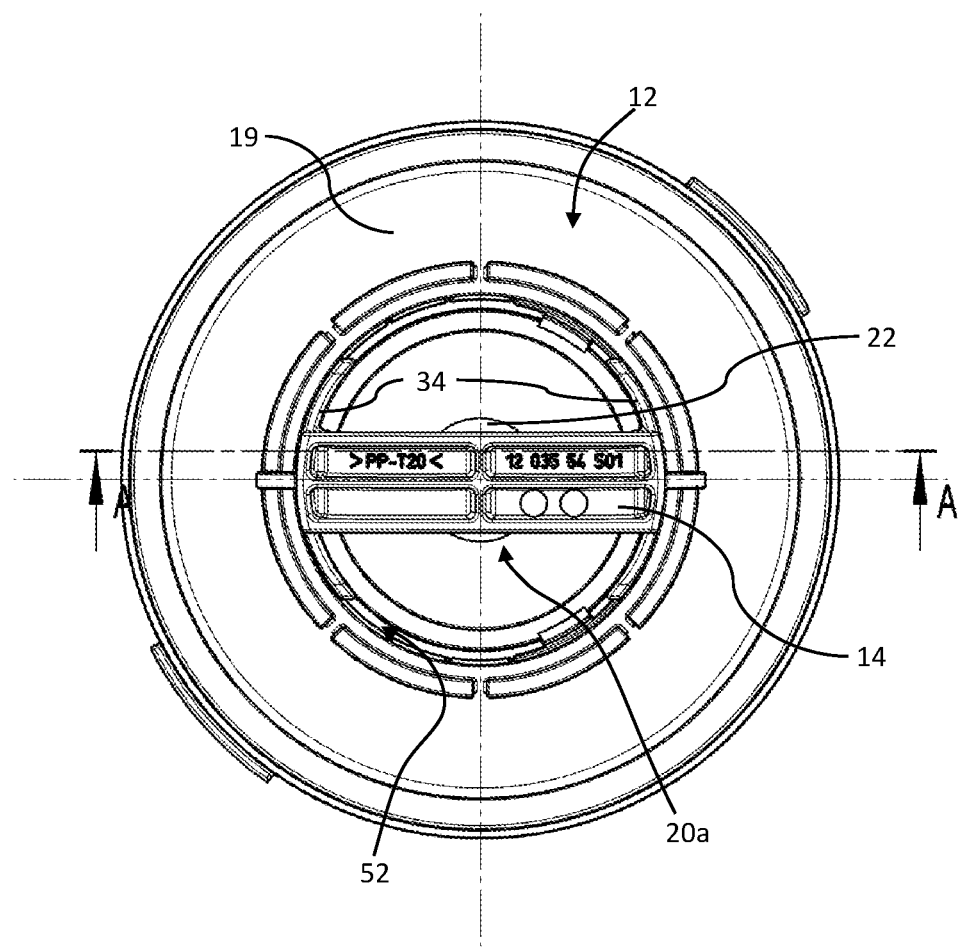

FIG. 4b shows a schematic view of the removal aid 14 and of the separating element 12 according to FIG. 4a. The locking fingers 34 of the removal aid 14 engage from above the annular slot 52 of the end disk 20. The central recess 22 is formed concentric to the annular slot 52 in the end disk 20. The end disk region 20a delimits the central recess 22 in radial direction outwardly. The end disk region 20a is intermediately arranged in radial direction between the central recess 22 and the annular slot 52.

Figure 4C:
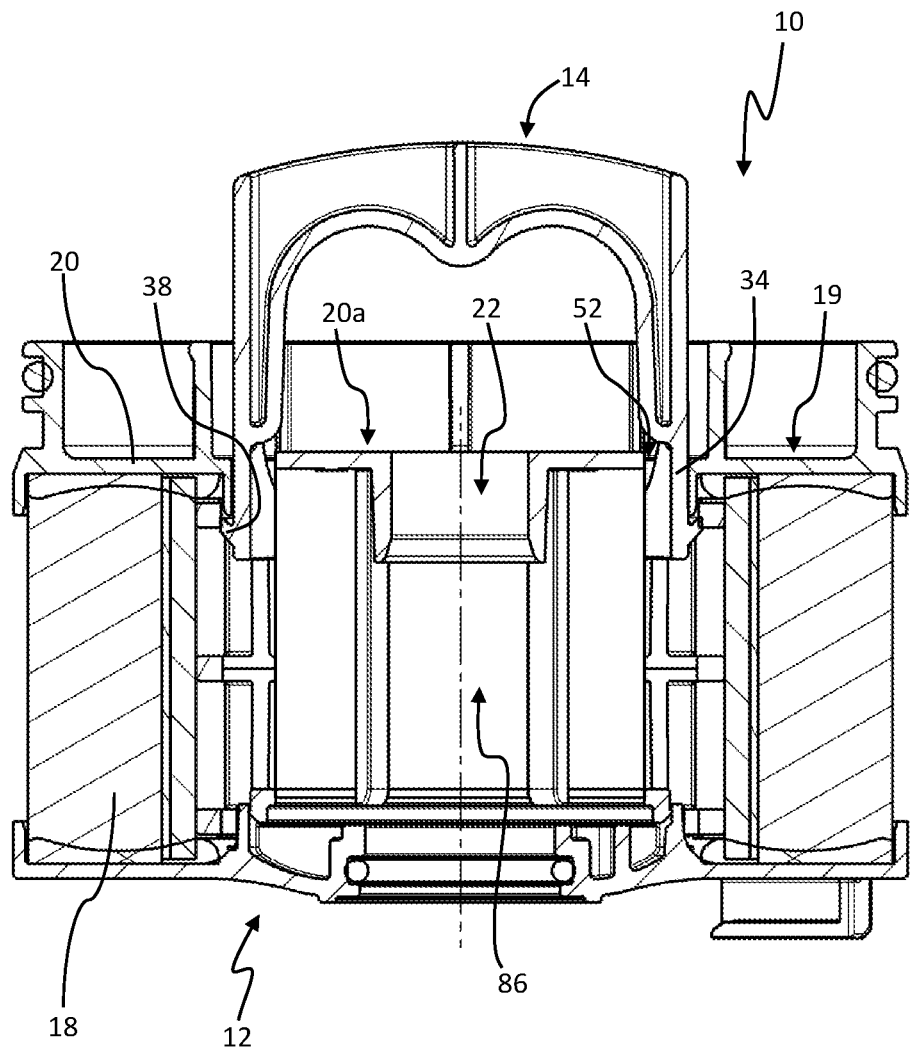
FIG. 4c shows a schematic longitudinal section of the removal aid and of the separating element of FIGS. 4a, 4b.

FIG. 4c shows a schematic longitudinal section along the plane A-A (compare FIG. 4b) through the removal aid 14 and the separating element 12 of the removal system 10 of FIGS. 4a, 4b after completed removal of the separating element 12 from the housing (compare FIG. 4a). The separating element 12 comprises a separating medium 18 that is secured with the end face on the end disk 20. The separating medium 18 is glued to the end disk 12 in this case. The central opening or recess 22 of the end disk 20 provides a fluidic passage into an interior 86 of the separating element 12. A fluid can flow in operation of the separating element through the central opening or recess 22 into the interior 86 or flow out from the interior 86. The central opening or recess 22 provides therefore a flow opening for the fluid.

Radially outside of the end disk region 20a delimiting the central opening or recess 22, the removal aid 14 projects with its locking fingers 34 into the annular slot 52 of the end disk 20. Hook elements 38 which are integrally formed on the locking fingers 34 so as to face in radial outward direction engage behind the end disk 20.

The afore described removal aids are distinguished by an improved tilting stability due to a point of attack at the end disk that, in radial direction, is spaced apart from the central recess of the end disk or from an end disk region that is immediately adjoining it. Moreover, the separating element to be removed from the housing can be more simply wiggled free or loosened by rotation from its seat within the housing and subsequently pulled out.

What is claimed is:

1. A removal system comprising:
   a separating element configured to separate contaminants contained in a fluid,
   wherein the separating element comprises:
      a separating medium surrounding a longitudinal axis;
      an end disk fixed onto an end face of the separating medium, the end disk having a collar extending axially from the end disk and comprising at least one slot; and
   a removal aid configured to engage the disk to remove the separating element from a housing, the removal aid having a center axis and comprising:
      a grip section having a first radially outer end and an opposite second radially outer end, the grip section spaced axially from the end disk of the separating element with the removal aid engaging the end disk;
      wherein each of the first radially outer end and the opposite second radially outer end of the grip section has at least one locking finger projecting axially from the grip section;
      wherein the at least one locking finger includes at least one projection configured to engage the at least one slot of the collar of the end disk with the removal aid engaging the end disk for removing the separating element from the housing.

2. The removal system according to claim 1, wherein
the collar is formed on the end disk and projects axially outwardly from the end disk in a direction away from the separating medium;
wherein the at least one slot extends from an axially outer end of the collar in a direction towards the separating medium; and
wherein the at least one projection of the at least one locking finger of the grip section extends in a radial direction outwardly from the at least one locking finger and engages into the at least one slot of the collar to rotate the separating element relative to the housing by the removal aid.

3. The removal system according to claim 2, wherein
the at least one locking finger of the grip section is a plurality of locking fingers circumferentially spaced apart about a circumference of the grip section;
the at least one slot is a plurality of slots; and
the at least one projection of each of the plurality of locking fingers engages into a corresponding one of the plurality of slots, rotationally locking the removal aid to the separating element, such that the separating element can be rotated relative to the housing by the removal aid.

4. The removal system according to claim 1,
wherein the end disk comprises
a central recess extending axially through the end disk into an open interior of the separating medium;
an annular slot disposed radially outward from the central recess; and
wherein the at least one locking finger engages the annular slot of the end disk.

5. The removal system according to claim 2, wherein
the at least one locking finger is a plurality of locking fingers circumferentially spaced apart about a circumference of the grip section, and
the at least one slot of the collar extends in a radially outward direction.

6. The removal system according to claim 1, wherein
the at least one locking finger is a plurality of locking fingers circumferentially spaced apart about a circumference of the grip section, and
the at least one projection of the plurality of locking fingers is oriented outwardly in a radial direction relative to the center axis.

7. A removal system comprising:
a separating element configured to separate contaminants contained in a fluid,
wherein the separating element comprises:
a separating medium surrounding a longitudinal axis that defines an axial direction and a radial direction transverse to the longitudinal direction, the longitudinal axis extending through an interior of the separating medium;
an end disk fixed onto the separating medium, the end disk having a central recess arranged on the longitudinal axis and extending through the end disk into the interior of the separating medium;
a collar extending axially from the end disk away from the separating medium, the collar comprising at least one slot; and
a removal aid configured to engage the end disk to remove the separating element from a housing, the removal aid having a center axis aligned parallel to the longitudinal axis with the removal aid engaging the end disk of the separating element, the removal aid comprising:
a grip section forming a handle spaced axially from the end disk with the removal aid engaging the end disk of the separating element, the grip section having a first radially outer end and an opposite second radially outer end;
wherein the first radially outer end and the opposite second radially outer end of the grip section are each provided with at least one locking finger having at least one projection configured to engage the at least one slot of the collar of the end disk for removing the separating element from the housing.

8. The removal system according to claim 7, wherein
the at least one locking finger is a plurality of locking fingers circumferentially spaced apart about a circumference of the grip section; and
the at least one projection of each of the plurality of locking fingers is oriented outwardly in the radial direction.

9. The removal system according to claim 7, wherein
the at least one locking finger is a plurality of locking fingers circumferentially spaced apart about a circumference of the grip section; and
the at least one slot of the collar extends axially and radially relative to the center axis.

* * * * *